June 13, 1967  W. R. ST. ONGE  3,324,831
FOLDABLE PET HOUSE
Filed April 26, 1965
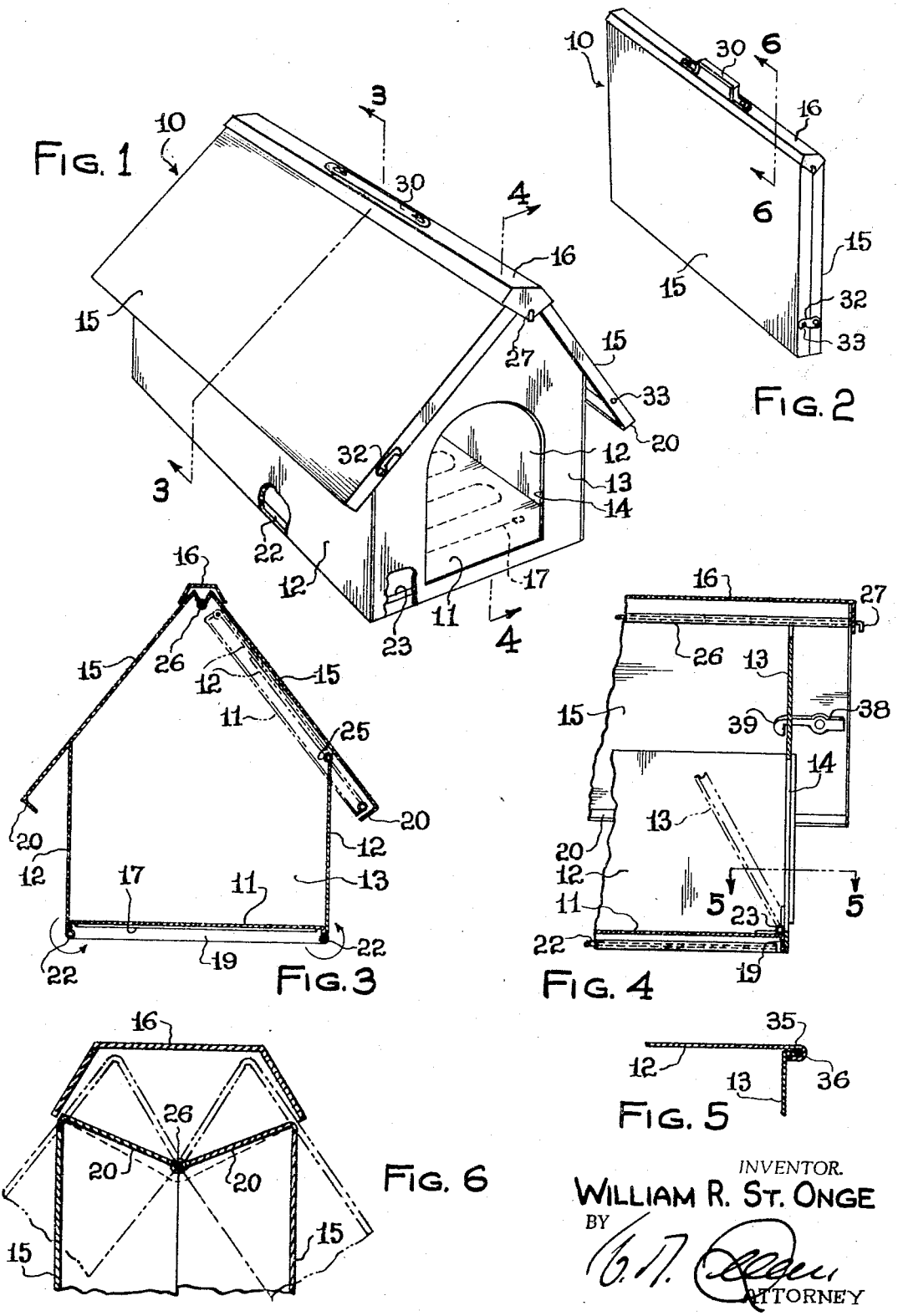
INVENTOR.
WILLIAM R. ST. ONGE
BY
ATTORNEY

United States Patent Office 3,324,831
Patented June 13, 1967

3,324,831
FOLDABLE PET HOUSE
William R. St. Onge, Garden Grove, Calif.
(6142 Franklin Ave., Los Angeles, Calif. 90028)
Filed Apr. 26, 1965, Ser. No. 450,868
13 Claims. (Cl. 119—19)

This invention relates to pet houses and more particularly to a unique, compactly folding pet house the principal components of which are pivotally interconnected with one another and movable between the erected and collapsed positions thereof and so arranged as to be held in either position without need for the use of fasteners or tools. The house, made of lightweight sheet components, folds compactly and is easily carried in the hand from place to place and can be quickly erected or collapsed by the novice simple by the operation of latch means functioning to hold the components rigidly extended or compactly folded at the user's option.

Demountable houses for pets have been proposed heretofore but these are subject to numerous disadvantages avoided by the present invention. For example, such prior constructions include a large number of separate components. These are both bulky and heavy and require fasteners for holding them in assembled position. Considerable time and skill is required in both erection and disassembly of the components and usually separate means is required to hold these components packaged if it is desired to transport them to a different location.

The pet house embodying the present invention is formed entirely of lightweight, rigid sheet members with each member being hingedly assembled to at least one other member. In consequence of this and the abutting relationship between certain surfaces of adjacent components, the assembly can be latched rigidly in an erected position. When this latch means is released the parts readily fold against one another, and preferably with the walls and bottom folding against one another interiorly of the two roof halves. The roof halves then fold together to provide an enclosing case for the assembly.

It follows from the foregoing that all parts of the invention house are designed for assembly at the place of manufacture following which the parts are compactly folded to occupy a minimum of packaging and shipping space. The merchant handling the product can quickly erect one of the pet houses for display without any except the simplest instructions and without need for tools and in the short interval required to open the roof halves away from one another, to fold the walls upwardly, and to latch them in open position. Upon completion of a sale to a customer, the erected house can be expeditiously unfolded and latched closed in a neat package having a carrying handle by which the purchaser can carry the assembly to his home. Thereafter, the house may be repeatedly erected and collapsed to meet the needs of use.

Accordingly, it is a primary object of the present invention to provide an improved collapsing pet house made of lightweight materials all hingedly interconnected with one another and adapted to be held collapsed and erected by simple locking means.

Another object of the invention is the provision of a lightweight, compactly folding pet house in which the bottom and wall components fold compactly against one another and between a pair of roof members serving additionally as a carrying case for the assembly.

Another object of the invention is the provision of a pet house all components of which are movably interconnected with one another and foldable into a compact carrying case provided by a pair of the components.

These and other more specific objects will appear upon reading the following specification and claims and upon considering in connection therewith the attached drawing to which they relate.

Referring now to the drawing in which a preferred embodiment of the invention is illustrated.

FIGURE 1 is a perspective view of a preferred embodiment of the invention fully erected and ready for use;

FIGURE 2 is a perspective view of the invention assembly compactly folded;

FIGURE 3 is a cross-sectional view taken along line 3—3 on FIGURE 1;

FIGURE 4 is a fragmentary view taken along line 4—4 on FIGURE 1;

FIGURE 5 is a fragmentary view on an enlarged scale taken along line 5—5 on FIGURE 4; and FIGURE 6 is a fragmentary cross-sectional view on an enlarged scale taken along line 6—6 on FIGURE 2.

Referring more particularly to FIGURES 1 and 2, there is shown a preferred embodiment of the invention pet house designated generally 10, FIGURE 1 showing the components expanded and locked in the erected position thereof, whereas FIGURE 2 shows the components folded between the two halves of the roof structure. The principal components of the assembly include a bottom 11, a pair of side walls 12, 12, and a pair of end walls 13, 13 one of which is provided with an opening 14. The remaining components include a pair of shallow, tray-like roof members 15, 15 and a ridge member 16. Additionally, bottom 11 is preferably fitted on its underside with a thin panel-type electric heating element 17 which may be held detachably against the bottom, as by a pair of clips or the like, not shown.

The components may be formed of any suitable lightweight sheet metal, plastic or wood material, sheet aluminum or its equivalent. As is best shown in FIGURES 3 and 4, bottom 11 preferably has a downturned flange 19 surrounding its perimeter and serving important functions to be described below. Roofing halves 15, 15 are also preferably provided with a downturned perimeter flange 20 and these serve to reinforce the roof as well as to improve its appearance. In addition, these flanges close against one another in the collapsed position of the assembly, in the manner best shown in FIGURE 2, to provide a casing enclosing and concealing the wall and bottom components when the assembly is collapsed.

Side walls 12, 12 are hingedly connected to the lower edge of bottom flange 19 by hinge pin 22. It will also be understood that the end walls 13, 13 are connected to the main body of bottom 11 by hinge means 23 located adjacent the upper edges of the downturned end flanges of the bottom (FIGURE 4). Owing to the arrangement of hinge 23 in the manner shown in FIGURE 4, it will be clear that the end walls are free to pivot between an upright position and a folded position against the upper surface of bottom 11. However, they cannot fold outwardly beyond their upright positions because their downwardly extending lower edges abut the downturned flange 19 of the bottom. For similar reasons, side walls 12, 12 cannot fold toward one another beyond the upright position owing to the abutting contact of their lower portions with portions of flange 19 along either side of the bottom. However, they are free to fold through 270 degrees against heating element 17 on the underside of the bottom. It will thus be clear that end walls 13, 13 fold against one another on the upper side of bottom wall 11, whereas side walls 12, 12 fold against one another on the opposite or underside of the bottom.

Another important pivot connection is the hinge 25 (FIGURE 3) provided between the upper edge of one side wall 12 and the underside of the adjacent roof half 15. The final hinge is that shown at 26 interconnecting an adjacent pair of downturned roof flanges 20, 20. This hinge includes a hinge pin 27 (FIGURES 1 and 4) serving to hold the roof members and ridge member 16 together. This ridge member is so made as to provide a very effective weatherproof cover member for the peak of the roof in the erected position of the components for reasons best illustrated in FIGURE 3. When the roof members are folded together, the ridge member overlies and covers the upper edge of the carrying case, in the manner shown in FIGURE 6, and provides a suitable support for the carrying handle 30. When not in use, this handle is flattened against the ridge member as is shown in FIGURE 1, whereas in its carrying position the handgrip is extendible to the position clearly illustrated in FIGURE 2. When the parts are collapsed for carrying, the roof halves are locked together as by a latch 32 which is engageable over a detent pin 33 on the other roof half.

Referring now more particularly to FIGURE 5, it is pointed out that, if desired, the vertical edges of the end walls may be provided with an outturned flange 35 which is seatable within the inturned edge 36 of side wall 12. This design provides a weatherproof, easily separable joint along the four upright corners of the structure. It will also be noted that the vertical edges of the end walls lie inwardly from the corresponding vertical edges of the side walls. In the erected position of the parts, the walls are rigidly locked in this position as by latch members 38 secured to the underside of roof halves 15 in the manner best shown in FIGURE 4. It will be understood that the latch ends 39 of these latches project through cutouts in the upper edge of the end walls and interlock with the edges of the cutouts to hold the end walls in erect position. There is at least one such latch member associated with each end wall.

Assuming that the components are in their erect position, pet house 10 is folded quickly and simply by opening latches 38 thereby permitting end walls 13, 13 to be folded toward one another and downwardly against the top side of bottom 11. Thereafter, the bottom and two side walls are swung as a unit about hinge 25 until the left-hand wall 12, as viewed in FIGURE 3, can be pivoted counter-clockwise against the underside of bottom 11. Thereafter, bottom 11 is pivoted counterclockwise about hinge 22 following which the folded components are swung upwardly about hinge 25 until they lie in the dot-and-dash line fully collapsed position indicated in FIGURE 3. Once this is accomplished, the two roof halves are closed against one another and latched closed by latch 32.

The folded house is erected by following the reverse of the collapsing operations just described following which the parts are latched fully extended by latch members 38.

While the particular folding pet house herein shown and disclosed in details is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. A collapsing compactly folding pet house adapted to be carried in one hand comprising, a bottom, a pair of side walls and a pair of end walls hinged to the opposite sides and the opposite ends respectively of said bottom and foldable thereagainst, a pair of roof members having upper ridge edges permanently hinged together along the upper ridge edges thereof, and hinge means permanently connecting one only of said side wall members to the inner side of one of said roof members inwardly from the lower edge thereof and so positioned that said end and side walls and said bottom fold between and are concealed by said pair of roof members in the folded condition of said pet house.

2. A compactly folding pet house formed in one unitary assembly and adapted to be held erected with permanently attached fasteners and to be quickly folded upon release of said attached fasteners, said pet house having a bottom, a pair of side walls and at least one end wall each hinged to the edges of said bottom, roof means comprising a pair of similar inverted tray-like members at least as large as said bottom and hinged together along their adjacent upper edges and cooperating to enclose said bottom, side and end walls when collapsed thereabout, hinge means connecting one of said roof members to the upper edge on one of said side wall members and serving to hold said roof means movably assembled to the remaining components of said housing, and releasable lock means for holding said components unfolded with said walls upright and abutting the underside of said roof means; and said bottom, side and end walls being foldable compactly within said pair of tray-like roof members when said releasable lock means is released.

3. A pet house is defined in claim 2 characterized in that said bottom has downturned flanges along the sides and the ends thereof, said sidewalls being hinged to the lower edges of said downturned flanges and said end walls being hinged to the upper edges of said downturned flanges.

4. A pet house as defined in claim 2 characterized in that said bottom has down-turned flanges along the opposite sides thereof to the lower edges of which said sidewalls are hinged for folding inwardly against the underside of said bottom.

5. A pet house as defined in claim 2 characterized in the provision of handle means along the hinged edges of said pair of roof members for use in carrying said pet house from place to place in both the collapsed and extended conditions thereof.

6. A compactly folding pet house all principal components of which are permanently hingedly interconnected, said pet house having as its principal components a bottom, two roof halves and pairs of end and side walls, hinge means pivotally and permanently interconnecting said roof halves to each other and each of the remaining components with at least one adjacent component and in such manner that said components are compactly foldable one against the other with the respective pairs of end and sidewalls being foldable against the opposite sides of said bottom and concealed by said roof halves, means for holding said components folded together and including means for holding said components extended with said end and side walls and said bottom rigidly erected and at right angles to one another beneath said roof halves.

7. A folding pet house as defined in claim 6 characterized in that said bottom includes an electric heater unit detachably supported on the underside thereof and foldable along with said bottom and walls between said roof halves.

8. A folding pet house as defined in claim 6 characterized in that said roof halves have flanged rims projecting toward one another with their edges in closely spaced abutting relation in the folded condition of said components to enclose and conceal said bottom, end and side walls.

9. A folding pet house as defined in claim 6 characterized in that said roof halves project substantially beyond said end and side walls in both the extended and collapsed positions of the pet house.

10. A folding pet house as defined in claim 9 characterized in the provision of latch means pivotally supported on at least one of said roof halves exteriorly of said end wall and engageable therewith to lock said pet house in its extended upright position.

11. A folding pet house as defined in claim 6 characterized in that said bottom has a pair of downturned flanges along two opposite edges thereof, and in that the lower edges of said flanges are hinged to the adjacent ones of the wall components whereby said walls abut the exterior faces of said flanges and cooperate therewith when latched to adjacent ones of said components to hold said components rigidly erected.

12. A folding pet house as defined in claim 11 characterized in that a first pair of remotely positioned wall components are foldable toward and away from said bottom with the opposite vertical edges thereof spaced inwardly from the adjacent vertical edges of a second pair of said wall components, whereby said first pair of erect walls cooperate in holding said second pair of walls upright and against inward collapse toward one another.

13. A folding pet house as defined in claim 6 characterized in that said roof halves include an inverted channel-like ridge member overlying and movably connected to said roof halves opposite and outwardly of the hinge connection between said roof halves and providing a water-shedding ridge member for said roof.

References Cited

UNITED STATES PATENTS

| | | | |
|---|---|---|---|
| 1,558,545 | 10/1925 | Hoyle | 119—19 |
| 1,671,051 | 5/1928 | Soderquist | 220—6 |
| 2,258,344 | 10/1941 | Walker | 119—19 |
| 2,280,779 | 4/1942 | Barragy | 119—33 |
| 2,445,055 | 7/1948 | Capaul | 119—19 X |

SAMUEL KOREN, *Primary Examiner.*

HUGH R. CHAMBLEE, *Examiner.*